(12) United States Patent
Oda (10) Patent No.: US 11,150,127 B2
(45) Date of Patent: Oct. 19, 2021

(54) VIBROMETER ASSEMBLY, ROTATING MACHINE, AND VIBROMETER ATTACHMENT METHOD AND REMOVAL METHOD

(71) Applicant: MITSUBISHI HEAVY INDUSTRIES COMPRESSOR CORPORATION, Tokyo (JP)

(72) Inventor: Takashi Oda, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 493 days.

(21) Appl. No.: 16/328,436

(22) PCT Filed: Dec. 6, 2016

(86) PCT No.: PCT/JP2016/005072
§ 371 (c)(1),
(2) Date: Feb. 26, 2019

(87) PCT Pub. No.: WO2018/104981
PCT Pub. Date: Jun. 14, 2018

(65) Prior Publication Data
US 2021/0293611 A1    Sep. 23, 2021

(51) Int. Cl.
*G01H 1/00*       (2006.01)
*G01M 13/045*    (2019.01)

(52) U.S. Cl.
CPC .......... *G01H 1/003* (2013.01); *G01M 13/045* (2013.01)

(58) Field of Classification Search
CPC ........................... G01M 13/045; G01H 1/003
See application file for complete search history.

(56) References Cited

U.S. PATENT DOCUMENTS 3,859,847 A * 1/1975 Ronemus ............... G01H 1/003
                                                              73/660
4,018,083 A    4/1977 Hoffman
(Continued)

FOREIGN PATENT DOCUMENTS

JP    56145322 A * 11/1981    ............. G01H 1/003
JP    S56-145322 A    11/1981
(Continued)

OTHER PUBLICATIONS

Translation of JP-56145322-A (Year: 1981).*
(Continued)

*Primary Examiner* — Nathaniel T Woodward
(74) *Attorney, Agent, or Firm* — Osha Bergman Watanabe & Burton LLP (57) ABSTRACT

A vibrometer assembly including a vibrometer configured to measure vibration of a rotating shaft, includes: a probe of the vibrometer that is to be secured to a bearing device that supports the rotating shaft; a guide cylinder that is to be provided to a case so as to penetrate the case and protrude into the case, the case being located outside the bearing device; an attachment that is to be connected to the probe and inserted into the guide cylinder, and at least partially has a movable portion to allow the probe to be axially aligned with an inside securing portion in the bearing device; and an outside securing portion that secures the attachment to the guide cylinder or the case outside the case.

20 Claims, 8 Drawing Sheets

(56) References Cited

U.S. PATENT DOCUMENTS

| | | |
|---|---|---|
| 4,066,949 A | 1/1978 | Condrac |
| 6,006,164 A | 12/1999 | McCarty et al. |
| 6,378,382 B1 | 4/2002 | Noguchi et al. |

FOREIGN PATENT DOCUMENTS

| | | |
|---|---|---|
| JP | 2000-155073 A | 6/2000 |
| JP | 2002-148005 A | 5/2002 |
| JP | 2005-345277 A | 12/2005 |
| JP | 2016-151554 A | 8/2016 |
| JP | 2016151554 A * | 8/2016 |

OTHER PUBLICATIONS

Translation of JP-2016151554-A (Year: 2016).*
International Preliminary Report on Patentability in corresponding International Application No. PCT/JP2016/005072, dated Jun. 20, 2019 (6 pages).
International Search Report issued in International Application No. PCT/JP2016/005072; dated Feb. 14, 2017 (2 pages).
Written Opinion of the International Searching Authority issued in International Application No. PCT/JP2016/005072 dated Feb. 14, 2017 (3 pages).
Supplementary Search Report in corresponding European Application No. 16923353.3, dated Aug. 23, 2019 (9 pages).

* cited by examiner

VIBROMETER ASSEMBLY, ROTATING MACHINE, AND VIBROMETER ATTACHMENT METHOD AND REMOVAL METHOD

TECHNICAL FIELD

The present invention relates to a vibrometer assembly, a rotating machine including the vibrometer assembly, a method for attaching a vibrometer to the rotating machine, and a method for removing the vibrometer from the rotating machine.

BACKGROUND ART

To monitor vibration displacement of a rotating shaft or a position of a rotating shaft, a rotating machine such as a compressor includes a vibrometer (Patent Literature 1).

The vibrometer in Patent Literature 1 includes a probe which is used for measuring a distance from a surface of a rotating shaft by an eddy current, a wire (conductor) drawn from the probe, and an elongated probe holder, and is generally formed into a rod shape. The vibrometer is passed through a cylinder penetrating a case of a compressor or the like in a thickness direction, and secured to an end of the cylinder outside the case.

CITATION LIST

Patent Literature

Patent Literature 1: U.S. Pat. No. 4,066,949

SUMMARY OF INVENTION

Technical Problem

The vibrometer in Patent Literature 1 is secured to the case of the compressor or the like through the cylinder, but a distal end protruding into the case is not secured. Then, in trying to secure the distal end of the vibrometer near the rotating shaft, the distal end of the vibrometer is distant from the case, and even if the vibrometer is passed straight through the cylinder penetrating the case in the thickness direction, the distal end of the vibrometer cannot be smoothly inserted into a securing portion due to errors in machining or assembling, slight swing of the vibrometer in the cylinder, or the like.

From the above, the present invention, with respect to a vibrometer included in a rotating machine, has an object to provide a vibrometer assembly that facilitates a vibrometer attachment operation, a rotating machine including the vibrometer assembly, a method for attaching the vibrometer, and a method for removing the vibrometer.

Solution to Problem

One aspect of the present invention provides a vibrometer assembly including a vibrometer configured to measure vibration of a rotating shaft, including: a probe of the vibrometer that is to be secured to a bearing device that supports the rotating shaft; a guide cylinder that is to be provided to a case so as to penetrate the case and protrude into the case, the case being located outside the bearing device; an attachment that is to be connected to the probe and inserted into the guide cylinder, and at least partially has a movable portion to allow the probe to be axially aligned with an inside securing portion in the bearing device; and an outside securing portion that secures the attachment to the guide cylinder or the case outside the case.

In the vibrometer assembly of the above aspect of the present invention, it is preferable that the inside securing portion includes a female thread that is provided in a housing of the bearing device to secure the probe, and the outside securing portion includes a fixture that secures an end of the attachment to the guide cylinder outside the case.

In the vibrometer assembly of the above aspect of the present invention, the attachment preferably has a plurality of joints arranged in a length direction of the guide cylinder.

In the above configuration, it is preferable that the attachment has a plurality of parts, the parts adjacent to each other in the length direction forming the plurality of joins by being coupled by pins at least four points, the pins for two of the four points being directed perpendicularly to the pins for the other two points.

In the vibrometer assembly of the above aspect of the present invention, a seal is preferably provided to seal a radial gap between the guide cylinder and the attachment.

In the vibrometer assembly of the above aspect of the present invention, preferably packing is provided to the probe so as to be brought into close contact with an outer periphery of a conductor drawn through an inside of the attachment to an outside of the case.

The vibrometer assembly of the above aspect of the present invention preferably includes a cap that is to be mounted to the guide cylinder or the case so as to cover the outside securing portion.

Another aspect of the present invention provides a rotating machine including: the vibrometer assembly described above; a rotating shaft; a bearing; and a case.

Further aspect of the present invention provides a method for attaching a vibrometer configured to measure vibration of a rotating shaft to a rotating machine including the rotating shaft, including: a guiding step of inserting a probe of the vibrometer and an attachment connected to the probe from an outside of a case of the rotating machine into the case through a guide cylinder inserted into a through hole in the case, and making a distal end of the probe reach a bearing device that supports the rotating shaft; an axially aligning step of moving a movable portion at least partially included in the attachment to axially align the probe with an inside securing portion in the bearing device; an inside securing step of securing the probe to the bearing device inside the case; and an outside securing step of securing the attachment to the guide cylinder or the case outside the case.

Further aspect of the present invention provides a method for removing a vibrometer configured to measure vibration of a rotating shaft from a rotating machine including the rotating shaft, including: a step of, in a state in which: a probe of the vibrometer connected to an attachment enabled to move a movable portion partially included in the attachment is secured to a bearing device that supports the rotating shaft; and the attachment is secured to a case of the rotating machine or a guide cylinder provided to the case to hold the attachment, releasing the attachment from the case or the guide cylinder outside the case; a step of releasing the probe from the bearing device inside the case; and a step of withdrawing the probe and the attachment to an outside of the case.

Advantageous Effects of Invention

According to the present invention, the guide cylinder penetrating the case provides a path for securing or releasing the probe to or from the bearing device. Thus, the vibrometer can be attached or removed through the guide cylinder from outside the case.

The vibrometer is secured at two points: at the bearing device and at or near the case. It is difficult to secure the attachment and the probe to the inside securing portion in the bearing device due to errors or the like during hole machining or assembly even if the attachment and the probe are inserted straight through the guide cylinder. However, according to the present invention, by the guide cylinder it is enabled to guide the probe to a position of the inside securing portion, and further by the attachment it is enabled to axially align the probe with the inside securing portion, thereby allowing the probe to be easily secured to the inside securing portion.

DESCRIPTION OF EMBODIMENTS

Now, with reference to the accompanying drawings, a vibrometer assembly and a rotating machine according to an embodiment of the present invention will be described.

In this embodiment, a compressor is shown as an example of a rotating machine including a vibrometer 20.

Figure 1:
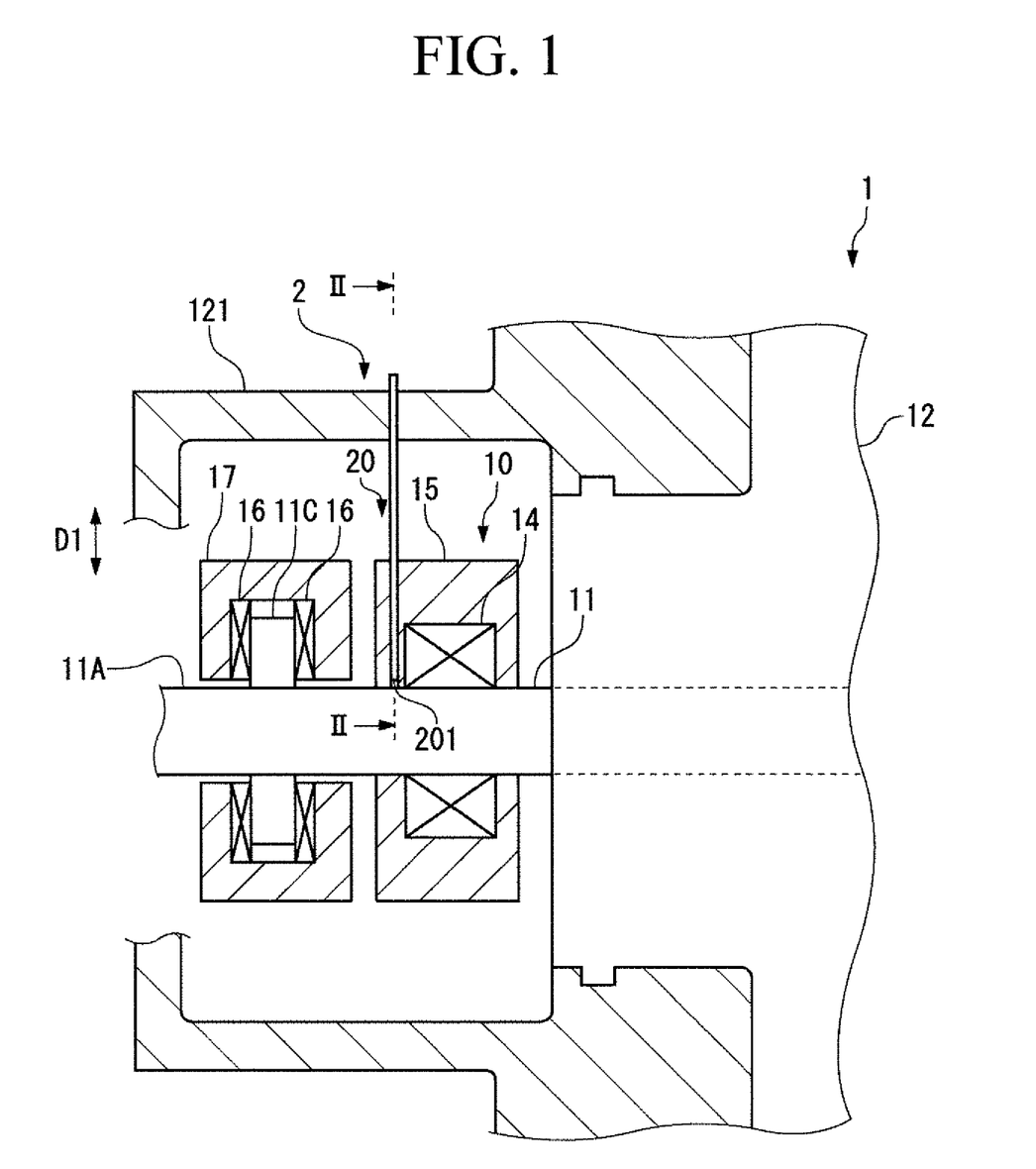
FIG. 1 is a schematic view of a compressor and a vibrometer that measures vibration of a rotating shaft according to an embodiment of the present invention.

A compressor 1 in FIG. 1 includes a rotating shaft 11 to which a compression mechanism (not shown) such as an impeller (a bladed wheel) is coupled, a case 12 (casing) that houses the compression mechanism, and a bearing device 10 that supports the rotating shaft 11.

The compressor 1 constitutes part of a facility such as a plant. The compressor 1 compresses gas introduced from outside into the case 12 using the compression mechanism and discharges the gas out of the case 12.

An end 11A of the horizontally extending rotating shaft 11 protrudes from one end side of the case 12, and is supported by the bearing device 10. An opposite end (not shown in FIG. 1) of the rotating shaft 11 also protrudes from the other end side of the case 12, and is supported by a journal bearing (not shown).

The bearing device 10 includes a journal bearing 14 that rotatably supports the rotating shaft 11, a bearing housing 15 that holds the journal bearing 14, thrust bearings 16 that axially support the rotating shaft 11, and a housing 17 that holds the thrust bearings 16.

The journal bearing 14 surrounds an outer periphery of the rotating shaft 11, and the thrust bearings 16 are arranged on opposite sides of a flange 11C protruding radially outward from the rotating shaft 11. The bearings 14, 16 are lubricated with a lubricant.

The bearing device 10 and a portion of the rotating shaft 11 protruding from the case 12 are covered with a cover case 121 provided to the case 12. In FIG. 1, the case 12 is not shown cutaway, but only the cover case 121 is shown cutaway.

Since a periphery of the rotating shaft 11 is sealed so as to prevent the gas in the case 12 from escaping out of the case 12, an ambience of the inside of the cover case 121 is the air.

To monitor vibration of the rotating shaft 11 and make the compressor 1 stably operate, the compressor 1 includes a vibrometer 20 that measures the vibration of the rotating shaft 11.

The vibrometer 20 measures vibration displacement of the rotating shaft 11 and a position of the rotating shaft 11 based on the vibration displacement, by using a distance between a distal end 201 close to an outer peripheral surface of the rotating shaft 11 and the outer peripheral surface of the rotating shaft 11. The distal end 201 of the vibrometer 20 is not in contact with the outer peripheral surface of the rotating shaft 11.

The vibrometer 20 is preferably also provided in a housing of the journal bearing (not shown) that supports the end opposite to the end 11A of the rotating shaft 11. The vibrometer 20 may be similarly provided in the housing 17 of the thrust bearings 16.

The vibrometer 20 and a member assembled to the vibrometer 20 are generally in the form of an elongated rod, and arranged toward the axial center of the rotating shaft 11 along a radial direction D1 of the bearing housing 15. To measure vibration displacement in any radial directions, two vibrometers 20 are actually provided and arranged perpendicularly to each other.

This embodiment has a main feature in a configuration of the vibrometer assembly 2 including the vibrometer 20.

Now, with reference to FIGS. 2 and 3, the configuration of the vibrometer assembly 2 will be described. The vibrometer assembly 2 includes, besides the vibrometer 20, part of the cover case 121, part of the bearing housing 15, an attachment 30 and a guide cylinder 40 both for supporting an operation for attaching the vibrometer 20 to the compressor 1, and an outside securing nut 45 (fixture) that secures the attachment 30 to the cover case 121.

Figure 2:
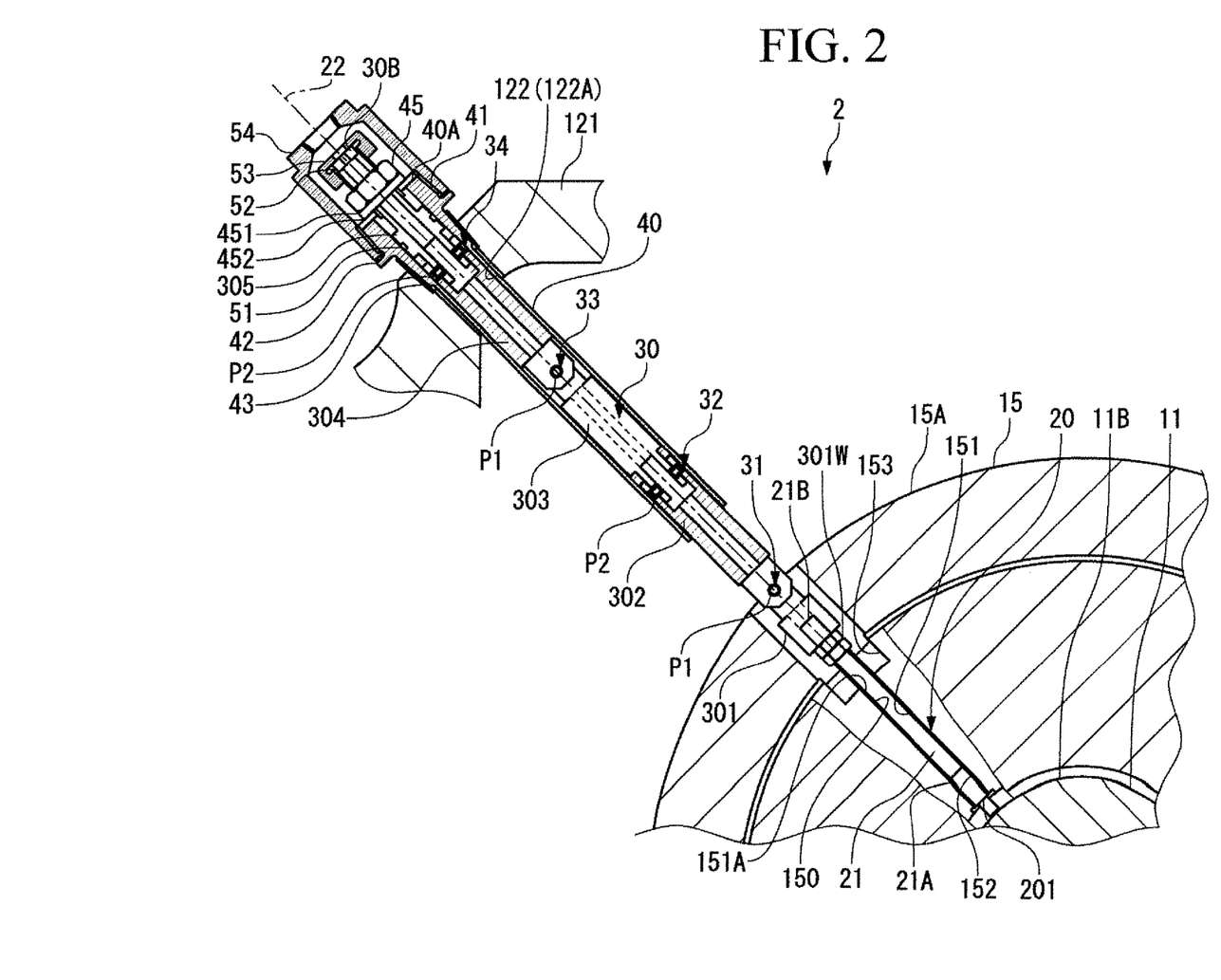
FIG. 2 is a sectional view taken along the line II-II in FIG. 1.

As shown in FIG. 2, the vibrometer 20 includes a probe 21 that measures a distance up to the outer peripheral surface of the rotating shaft 11, and a conductor 22 (shown by dot-and-dash line) drawn from the probe 21.

The vibrometer 20 may be a known distance measuring sensor that can detect a distance such as an eddy-current type or capacitance type sensor. An electric signal indicating the distance up to the outer peripheral surface 11B of the rotating shaft 11, the distance being detected by the probe 21 made of metal and energized through the conductor 22, is transmitted to a control circuit unit (not shown) through a different conductor 22.

As shown in FIG. 2, the probe 21 in this embodiment is linearly formed, and on at least a distal end side of an outer periphery of the probe 21 a thread 21A is provided. The probe 21 is shorter than a distance between the bearing housing 15 and the cover case 121.

The bearing housing 15 has a round hole 151 into which the probe 21 is inserted, and a female thread 152 continuous with the round hole 151. The thread 21A on the probe 21 is screwed into the female thread 152 to secure the probe 21 to the bearing housing 15. The probe 21 protrudes from the round hole 151 radially outward of the bearing housing 15 while being secured to the bearing housing 15.

The round hole 151 and the female thread 152 are formed toward the axial center of the rotating shaft 11 along the radial direction of the bearing housing 15. The axial center of the round hole 151 substantially matches the axial center of the female thread 152. The round hole 151 and the female thread 152 are collectively referred to as an inside insertion securing hole 150 (an inside securing portion).

When the probe 21 is secured to the bearing housing 15, the distal end of the probe 21 (the distal end 201 of the vibrometer 20) closely faces the outer peripheral surface 11B of the rotating shaft 11.

The bearing housing 15 has a recess 153 recessed from an outer periphery 15A, and an opening 151A of the round hole 151 is located at a bottom of the recess 153. Inside the recess 153, the probe 21 and the attachment 30 are connected with each other.

Depending on a length of the probe 21, the attachment 30 and the probe 21 may be connected outside the outer periphery 15A of the bearing housing 15. In that case, there is no need for the recess 153, and the round hole 151 may open in the outer periphery 15A.

It is assumed that the vibrometer 20 and the member assembled to the vibrometer 20 (hereinafter referred to as a complete set of vibrometer 20) are generally arranged inside the cover case 121. In that case, the probe 21 can be screwed to the bearing housing 15 by the thread 21A on the probe 21 and a nut attached to a portion of the probe 21 protruding from the bearing housing 15, and the conductor 22 drawn from the probe 21 can be connected to a terminal (not shown) prepared in the compressor 1.

If the complete set of vibrometer 20 is arranged inside the cover case 121, it is necessary to open the cover case 121 to access the vibrometer 20 for attaching or removing the vibrometer 20 in case of a fault or the like of the vibrometer 20. If at least part of the cover case 121 is removed, part of the rotating shaft 11 is exposed. Thus, the compressor 1 in operation needs to be suspended in view of safety.

In view of the above, in this embodiment, without opening the cover case 121, the vibrometer 20 is passed through a through hole 122 penetrating the cover case 121 in a thickness direction, and wherein from the outside of the cover case 121, the distal end 201 of the vibrometer 20 is secured to or removed from the bearing housing 15.

An operation for inserting the vibrometer 20 from the outside of the cover case 121 into the through hole 122 in the cover case 121 and also into the inside of the insertion securing hole 150 away from the through hole 122 is difficult, because a position of the inside insertion securing hole 150 cannot be visually checked, unlike an operation performed while the inside insertion securing hole 150 is directly visually checked with the opened cover case 121 as described above. When the vibrometer 20 is inserted into the through hole 122, the inside insertion securing hole 150 located on an extended line of the through hole 122 becomes completely invisible.

Of course, the inside insertion securing hole 150 (the round hole 151 and the female thread 152) and the through hole 122 are machined so that the axial center of the inside insertion securing hole 150 matches the axial center of the through hole 122. Even if the guide cylinder 40 is used to support the operation for inserting the vibrometer 20 into the through hole 122 and the inside insertion securing hole 150, that alone does not allow the vibrometer 20 to be smoothly inserted into the inside insertion securing hole 150 due to errors in machining, errors in assembly of the bearing housing 15, the cover case 121, and the guide cylinder 40, swing of the probe 21 inside the guide cylinder 40, or the like.

Particularly, in a case that an insertion length of the probe 21 into the inside insertion securing hole 150 is long as in this embodiment, the probe 21 can be inserted into an innermost part of the inside insertion securing hole 150 to secure the thread 21A on the probe 21 to the bearing housing 15 only when the probe 21 is inserted straight into the inside insertion securing hole 150 with the axial center of the inside insertion securing hole 150 being aligned with the axial center of the probe 21.

Thus, in this embodiment, as a component for supporting an operation for attaching the vibrometer 20 to the compressor 1, an attachment 30 (FIGS. 2 and 3) connected to the probe 21 is used in addition to the guide cylinder 40.

The attachment 30 extends radially outward of the bearing housing 15 so as to be continuous with the probe 21, and penetrates the through hole 122 to reach the outside of the cover case 121.

The attachment 30 is passed through the inside of the guide cylinder 40 penetrating the cover case 121, and has a plurality of (four here) joints 31 to 34 arranged in a length direction of the guide cylinder 40.

The attachment 30 at least partially has the joints 31 to 34 as movable portions that can move the axial center of the probe 21 to axially align the probe 21 with the inside insertion securing hole 150.

The attachment 30 includes five cylindrical parts 301 to 305 that form the joints 31 to 34. Among the parts 301 to 305, the parts adjacent to each other are coupled by pins to form joints bendable around the pins (P1, P2). For example, the part 301 connected to the probe 21 and the next part 302 form the joint 31.

The parts 301 to 305 are made of any metal material as necessary.

An orientation of the pins P1 in the two joints 31,33 among the joints 31 to 34 is perpendicular to an orientation of the pins P2 in the other two joints 32, 34.

Figure 3A:
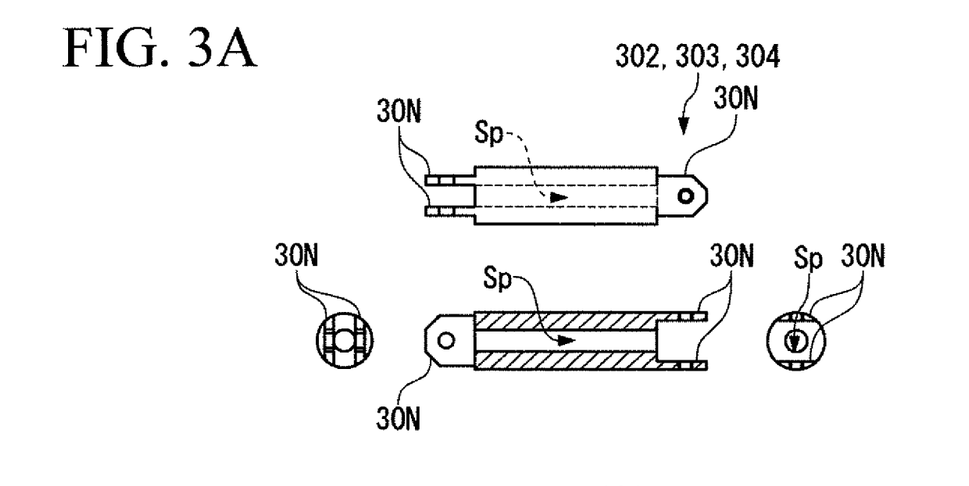
FIGS. 3A to 3C each show parts that constitute an attachment.
Figure 3B:
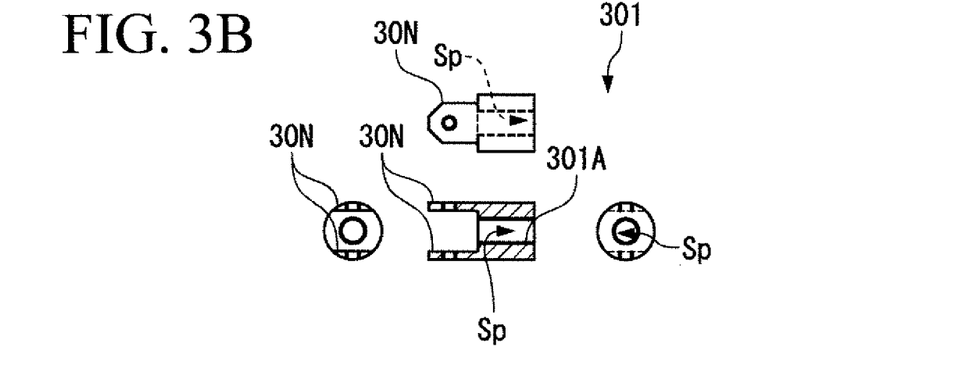
Figure 3C:
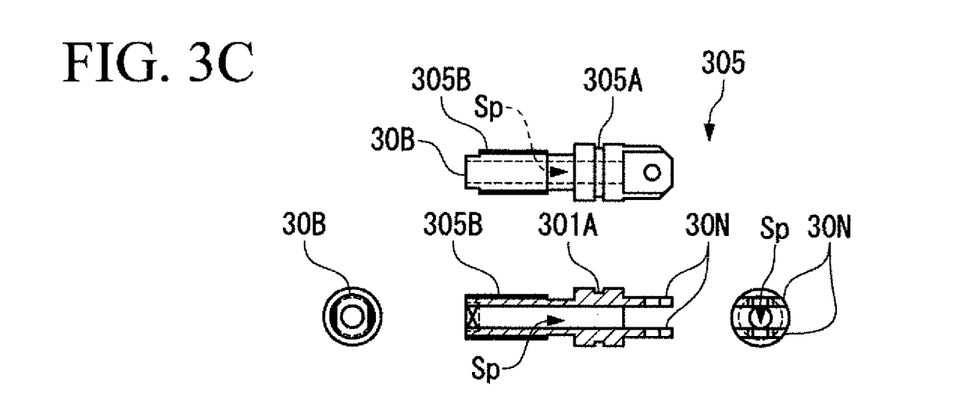

As shown in FIGS. 3A to 3C, the parts 301 to 305 each have a pair of pawls 30N, 30N on opposite sides in a width direction, and the pawls 30N, 30N are connected by a pair of pins pivotally supported. The conductor 22 of the vibrometer 20 is passed through a cylindrical space Sp formed inside each of the parts 301 to 305.

The three parts 302 to 304 are formed to have the same shape as shown in FIG. 3A. The parts 302 to 304 are coupled so that the pins P1, P2 are alternately oriented. The parts 302 to 304 do not always need to be alternately coupled.

The part 301 (FIG. 3B) coupled to the part 302 is connected to an end 21B (FIG. 2) of the probe 21 protruding from the round hole 151 radially outward of the bearing housing 15. The part 301 is arranged in the recess 153 in the bearing housing 15, but not limited to this, and may be arranged outside the outer periphery 15A of the bearing housing 15.

The end 21B of the probe 21 is screwed into a female thread 301A (FIG. 3B) formed inside the part 301, and secured to the part 301 by a double nut 301W (FIG. 2) for locking. The double nut 301W is rotated to adjust an insertion depth of the probe 21 into the female thread 301A, thereby increasing or decreasing a total length from the distal end 201 of the probe 21 to an outside end 30B of the part 305.

The part 305 (FIG. 3C) coupled to the part 304 is secured to the guide cylinder 40 by an outside securing nut 45 (FIG.

2) provided on an outer periphery of a protruding portion of outward the guide cylinder 40 and the cover case 121. Washers 451, 452 are held between the outside securing nut 45 and an upper end of the guide cylinder 40.

The length of the attachment 30 and the probe 21 (total length) is adjusted to a defined length by the double nut 301W so that the probe 21 is close to the rotating shaft 11 so as to be able to accurately detect vibration of the rotating shaft 11 and the attachment 30 can be secured to the guide cylinder 40 by the outside securing nut.

It is preferable to take measures to prevent oil for lubricating the journal bearing 14 from flowing from around the rotating shaft 11 along the conductor 22 in the probe 21 or flowing through a gap between an inner wall of the guide cylinder 40 and the attachment 30 to leak out of the cover case 121.

Thus, as shown in FIG. 2, the vibrometer assembly 2 of this embodiment includes a seal 51, packing 52, a packing retainer 53, and a cap 54.

The seal 51 is an O ring, and the seal 51 is arranged in a groove 305A (FIG. 3C) annularly formed along an outer periphery of the part 305, and intermediated in a compressed manner between the outer periphery of the part 305 and the inner wall of the guide cylinder 40 to seal a radial gap between the part 305 and the guide cylinder 40.

The packing 52 is mounted to the outside end 30B so that the conductor 22 exposed from the outside end 30B of the part 305 is passed through the packing 52. The packing 52 is pressed by the packing retainer 53 screwed onto a male thread 305B (FIG. 3C) on the part 305, and then is brought into close contact with an outer periphery of the conductor 22.

The cap 54 is mounted to the guide cylinder 40 so as to cover the outside securing nut 45 and the packing retainer 53. The conductor 22 is drawn, through the through holes in the packing retainer 53 and the cap 54, to outside the cap 54.

A sealing tape (not shown) is preferably provided between a cap attaching portion 41 on the guide cylinder 40 and a female thread in the cap 54. The sealing tape is compressed between the cap attaching portion 41 and the female thread both having a tapered shape, to eliminate a gap between the cap 54 and the guide cylinder 40.

Covering with the cap 54 can protect the attachment 30, the outside securing nut 45, the packing 52, and the like from external environment, external forces, and the like.

The cap 54 may be mounted to a cap attaching portion formed on the cover case 121.

To prevent leakage of the lubricant, the packing 52 and either one of the seal 51 or the cap 54 may be selected.

Next, the guide cylinder 40 (FIG. 2) is formed of a metal material into a cylindrical shape, and radially protrudes from the outside to the inside of the cover case 121 by penetrating the inside of the through hole 122. The attachment 30 is inserted into a cylindrical space formed inside the guide cylinder 40 having a certain inner diameter. A predetermined clearance is set between the inner wall of the guide cylinder 40 and the parts 301 to 305 of the attachment 30 so that the attachment 30 and the probe 21 can be smoothly inserted into the guide cylinder 40.

The guide cylinder 40 linearly corrects postures of the parts 301 to 305 connected to the probe 21, and guides the probe 21 and the attachment 30 up to the position of the inside insertion securing hole 150 in the bearing housing 15.

The part 305 of the attachment 30 is, by the outside securing nut 45, secured to an end surface 40A at the upper end of the guide cylinder 40 protruding outward of the cover case 121. The cap attaching portion 41 to which the cap 54 is mounted is formed at an upper portion than a flange 42 formed on an outer periphery of the upper end of the guide cylinder 40. The cap attaching portion 41 and a case attaching portion 43 described below are formed to be thicker than a portion below the case attaching portion 43.

The guide cylinder 40 is secured to the cover case 121 by the case attaching portion 43 formed on the outer periphery of the lower portion than the flange 42 being screwed into a female thread 122A that forms the through hole 122. The attachment 30 is secured to the cover case 121 through the guide cylinder 40. The attachment 30 may be directly secured to the cover case 121.

Figure 5:
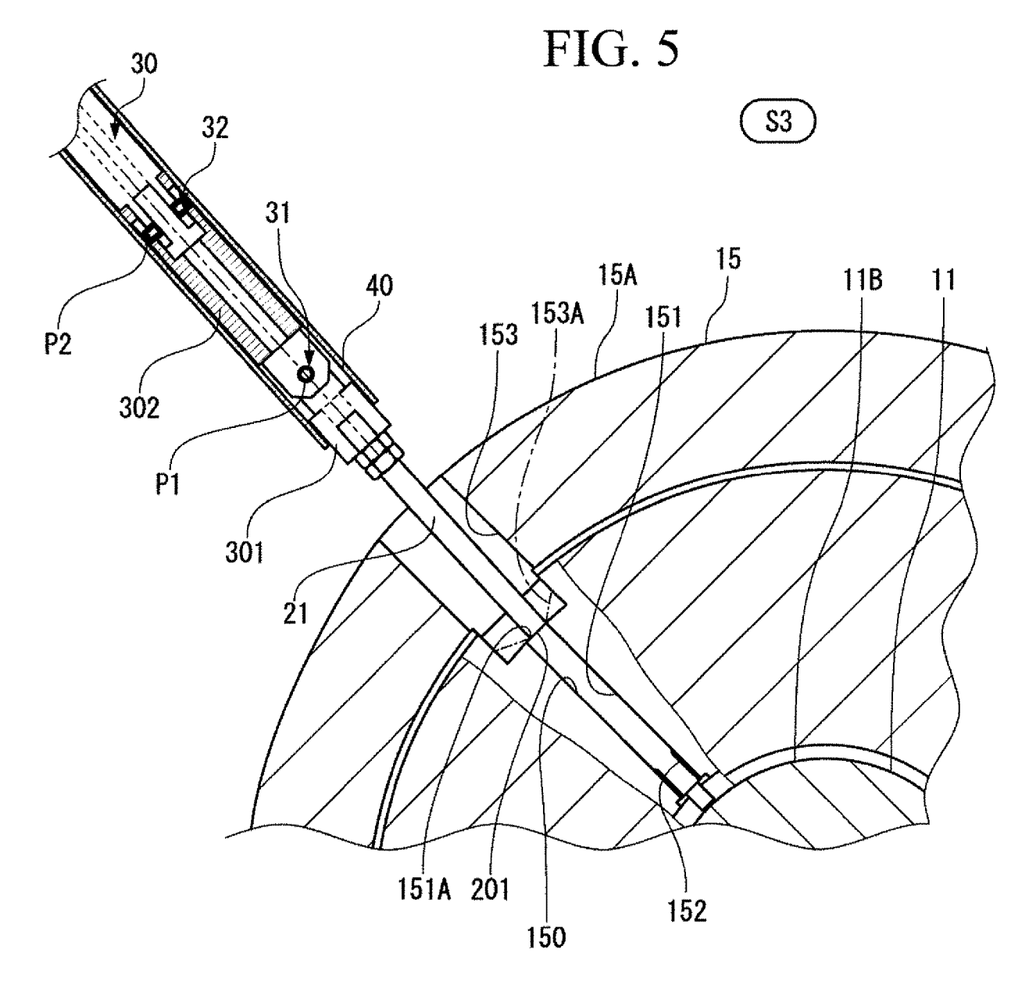
FIG. 5 shows a procedure for attaching the vibrometer to the compressor.

The length of the guide cylinder 40 is determined so that when the probe 21 of the vibrometer 20 and the attachment 30 connected to the probe 21 are inserted from the outside of the cover case 121 into the guide cylinder 40, and the distal end 201 of the probe 21 reaches the position of the opening 151A of the inside insertion securing hole 150, at least part of a cylindrical portion of the part 301 on the distal end side is located inside the guide cylinder 40 (see FIG. 5). The guide cylinder 40 may have a longer length as long as the guide cylinder 40 does not interfere with a surrounding member such as the bearing housing 15.

A procedure for assembling the vibrometer assembly 2 configured as described above, that is, a procedure for attaching the vibrometer 20 to the compressor 1 will be described.

Figure 4A:
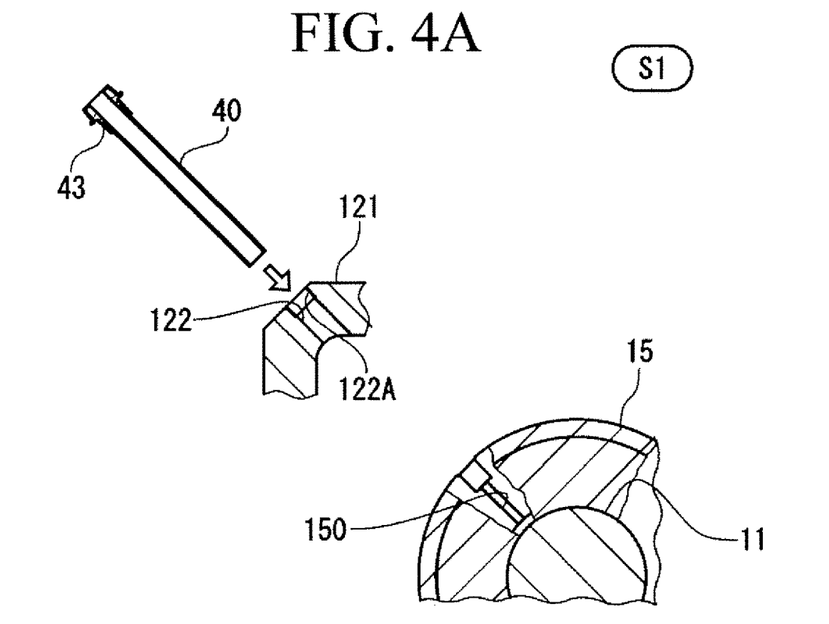
FIGS. 4A and 4B each show a procedure for attaching the vibrometer to the compressor.

First, as shown in FIG. 4A, the guide cylinder 40 is inserted from the outside of the cover case 121 into the through hole 122 and placed in the cover case 121 (guide cylinder placing step S1).

Figure 4B:
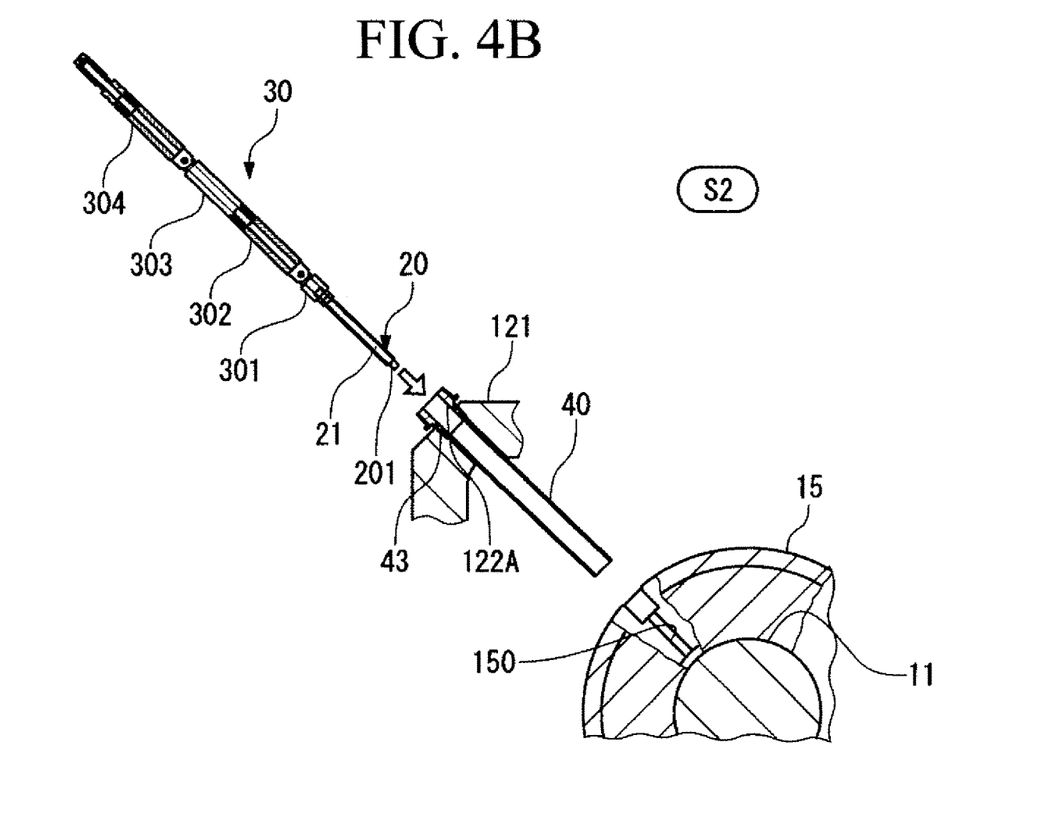

The case attaching portion 43 on the guide cylinder 40 is screwed into the female thread 122A in the cover case 121 to secure the guide cylinder 40 to the cover case 121 (FIG. 4B).

Then, as shown in FIG. 4B, the probe 21 of the vibrometer 20 and the attachment 30 assembled to the probe 21 are inserted from the outside of the cover case 121 into the guide cylinder 40, and the distal end 201 of the probe 21 is made to reach the bearing housing 15 (guiding step S2). At this time, the distal end 201 of the probe 21 does not always directly enter the inside insertion securing hole 150 in the bearing housing 15.

Figure 7A:
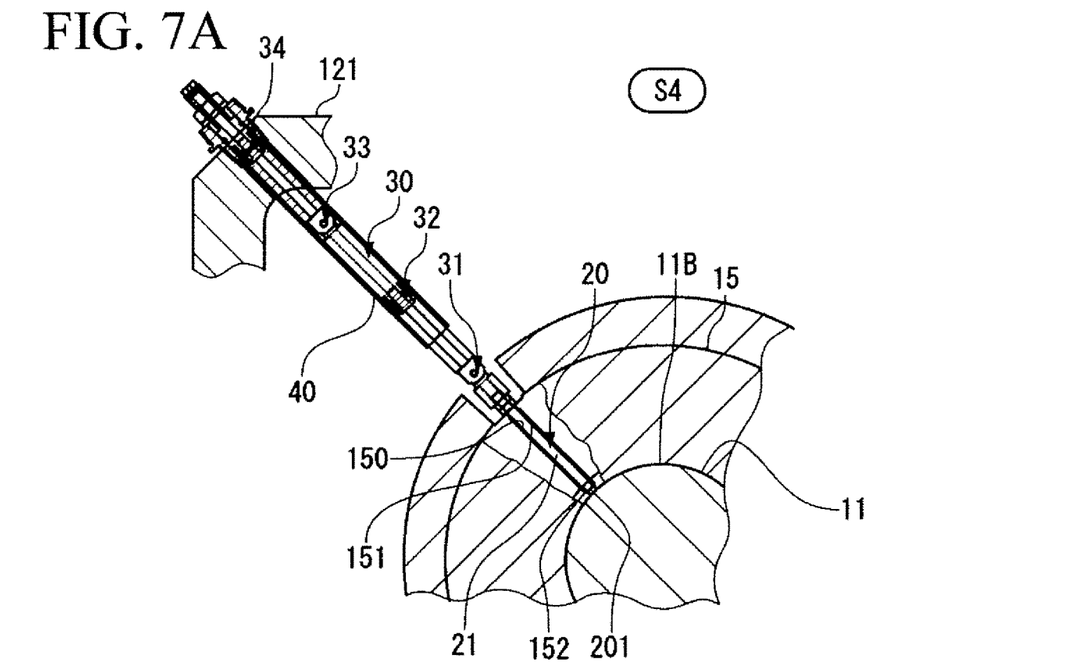
FIGS. 7A and 7B each show a procedure for attaching the vibrometer to the compressor.
Figure 7B:
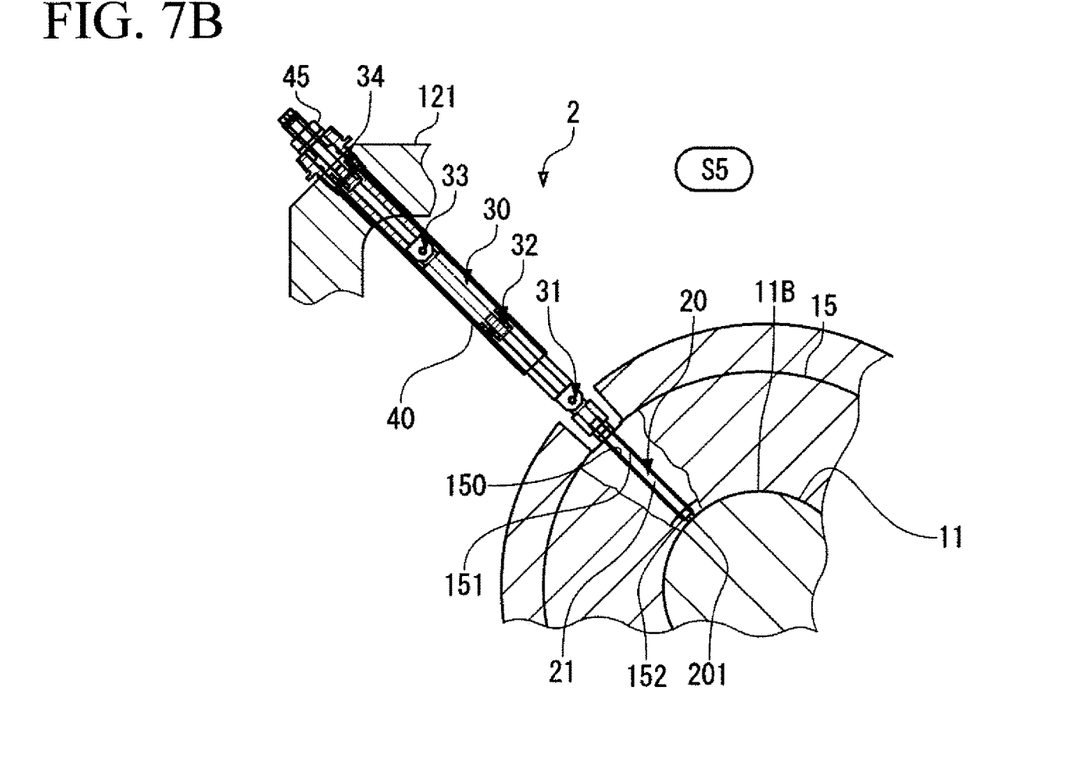

FIG. 4B does not show the conductor 22. FIGS. 7A and 7B are the same.

FIG. 5 shows a case where the distal end 201 of the probe 21 does not enter the inside insertion securing hole 150 due to errors in machining or the like of the through hole 122, the inside insertion securing hole 150, or the guide cylinder 40.

Before the distal end 201 of the probe 21 reaches the opening 151A of the inside insertion securing hole 150, the part 301 connected to the probe 21 is located inside the guide cylinder 40, and thus the posture of the probe 21 supported by the part 301 is along the axial center of the guide cylinder 40. Due to this, even if the axial center of the inside insertion securing hole 150 is not aligned with the axial center of the probe 21, the distal end 201 of the probe 21 is located at an edge of or around the opening 151A.

To insert the probe 21 in such a state into the inside insertion securing hole 150, it is necessary to use the attachment 30 to align the axial center of the probe 21 with the axial center of the inside insertion securing hole 150 (axially aligning step S3).

Figure 6A:
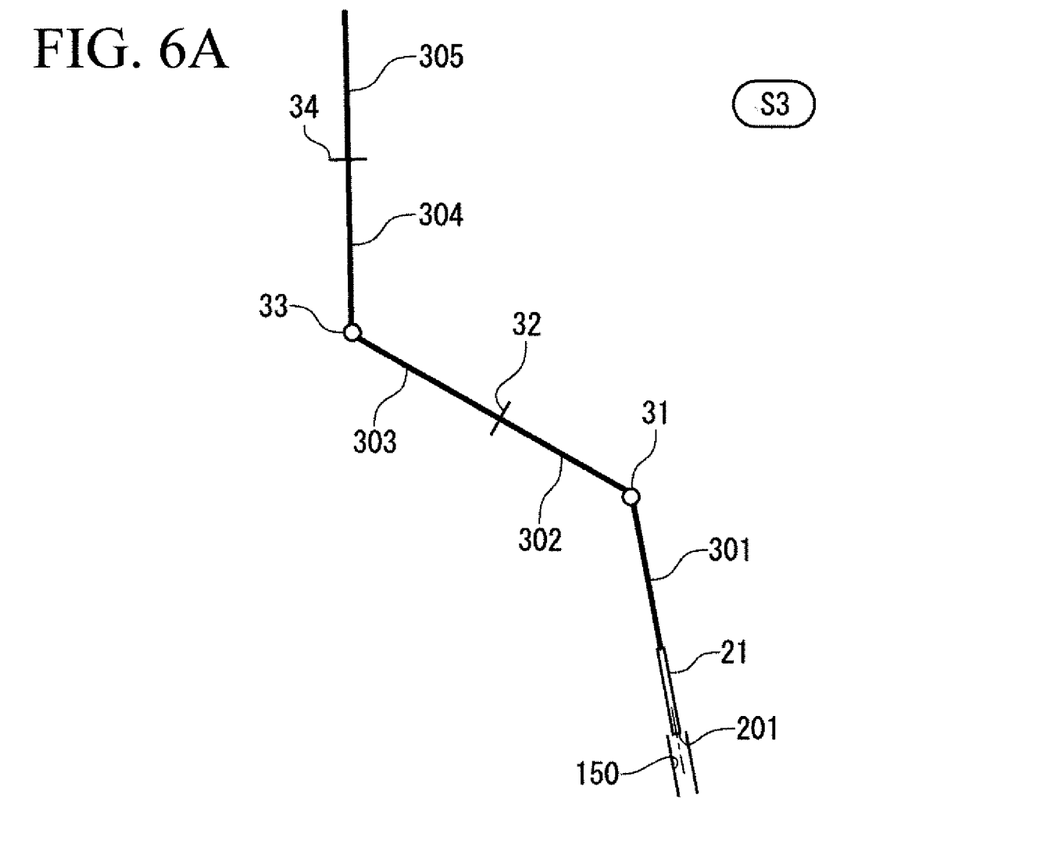
FIG. 6 is a schematic view illustrating an operation for aligning an axial center of a probe with an axial center of an insertion securing hole in a bearing housing using the attachment.

In this step S3, as schematically shown in FIG. 6A, the joints 31 to 34 as the movable portions of the attachment 30 are bent to change the posture (shape) of the attachment 30 inside the guide cylinder 40, to align the axial center of the probe 21 supported by the attachment 30 with the axial center of the inside insertion securing hole 150. FIG. 6A shows the adjacent parts 301 to 305 being bent with exaggerated angles. Actually, the parts 301 to 305 are slightly bent within the clearance in the guide cylinder 40.

FIG. 6A shows the attachment 30 being bent by the joints 31, 33, but the attachment 30 may be simultaneously bent by the joints 32, 34. The attachment 30 may be bent by at least one of the joints 31 to 34 to align the axial center of the probe 21 with the axial center of the inside insertion securing hole 150.

Figure 6B:
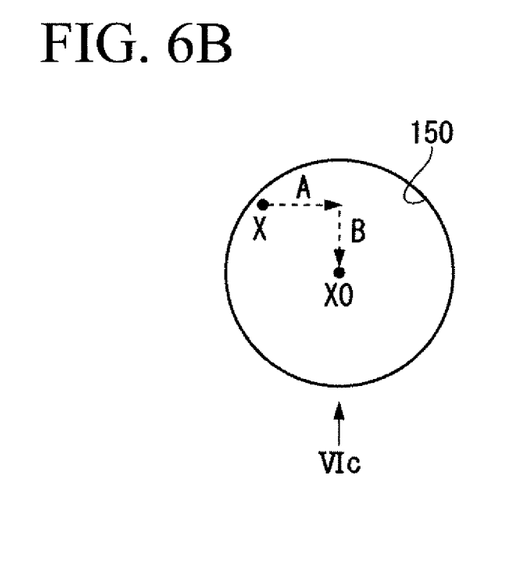
Figure 6C:
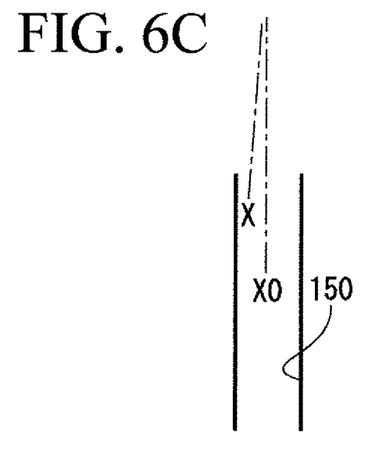

It is assumed that soon after the distal end 201 of the probe 21 reaches the position of the opening 151A of the inside insertion securing hole 150, the axial center of the probe 21 is located at a position X shifted from the axial center X0 of the inside insertion securing hole 150 as shown in FIG. 6B. Then, the posture of the attachment 30 is changed, for example, by the joints 31,33 to move the axial center X of the probe 21 as shown by arrow A in FIG. 6B, and the posture of the attachment 30 is changed by the joints 32, 34 to move the axial center X as shown by arrow B, thereby allowing the axial center X of the probe 21 to be aligned with the axial center X0 of the inside insertion securing hole 150. FIG. 6C shows axial centers X, X0 in the direction of VIc in FIG. 6B.

With the distal end 201 of the probe 21 butting against the edge of the opening 151A of the inside insertion securing hole 150 (FIG. 5), the attachment 30 is pushed or pulled along the guide cylinder 40 or rotated as necessary to perform the axial alignment using the attachment 30 as described above.

The round hole 151 has a clearance with respect to an outer diameter of the probe 21, and if the axial center X of the probe 21 is substantially aligned with the axial center X0 of the inside insertion securing hole 150, the distal end 201 of the probe 21 enters the opening 151A. Thus, the distal end 201 of the probe 21 is restrained by a peripheral edge of the opening 151A.

If a tapered surface 153A (shown by a dot-and-dash line) following a shape of a drill used for machining the recess 153 is formed at the bottom of the recess 153, the tapered surface 153A guides the distal end of the probe 21 toward a center of the opening 151A.

Then, as shown in FIG. 7A, the probe 21 is inserted into an innermost part of the inside insertion securing hole 150 to secure the distal end of the probe 21 to the female thread 152 (inside securing step S4). The attachment 30 is generally moved downward while changing its posture following the probe 21 inserted, and the state of axial alignment with respect to the probe 21 and the inside insertion securing hole 150 is maintained. At this time, the attachment 30 that supports the probe 21 is held by the guide cylinder 40, and thus the probe 21 can be stably screwed into the female thread 152.

Then, the probe 21 is positioned to create a gap from the outer peripheral surface 11B of the rotating shaft 11 while signals such as an eddy current and capacitance are monitored through the conductor 22 (FIG. 2).

Further, as shown in FIG. 7B, the attachment 30 is secured to the upper end of the guide cylinder 40 using the outside securing nut 45 (outside securing step S5). Thus, the attachment 30 is secured to the cover case 121 through the guide cylinder 40.

Thus, the vibrometer assembly 2 is completed.

Figure 8:
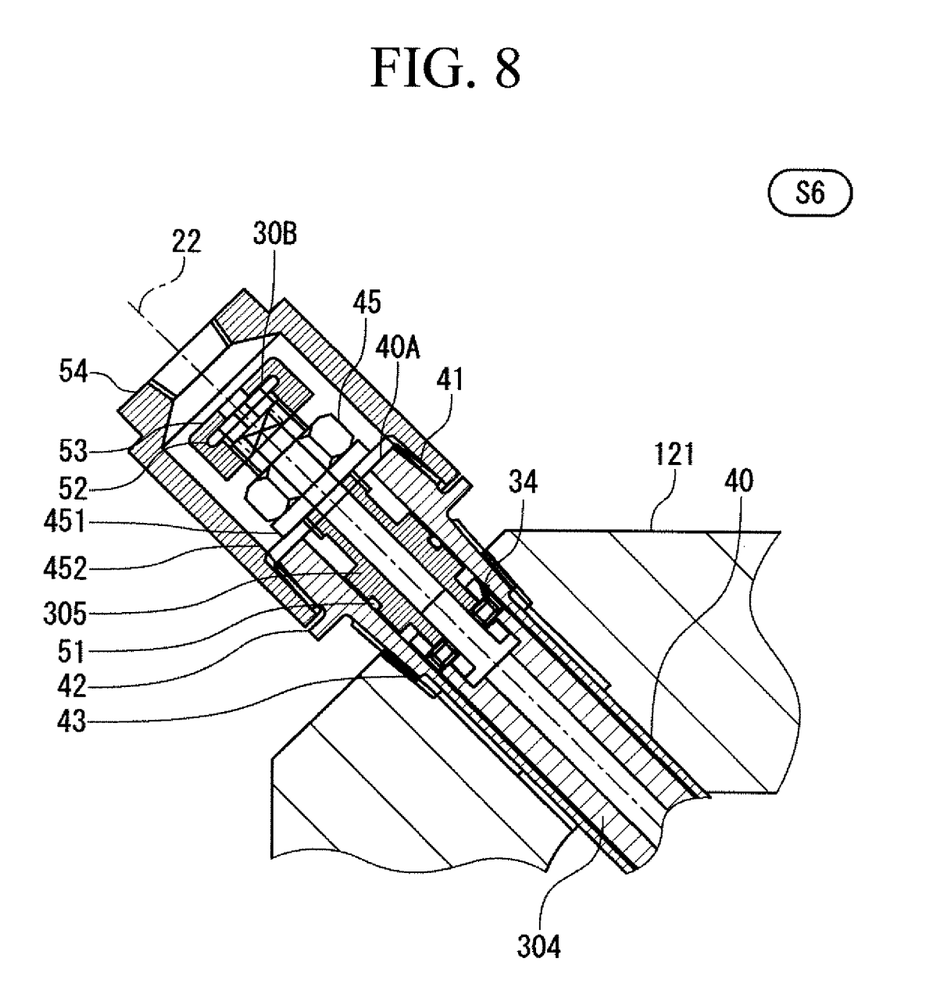
FIG. 8 shows a procedure for attaching the vibrometer to the compressor.

Finally, as shown in FIG. 8, the packing 52 is attached to the part 305 of the attachment 30 using the packing retainer 53, and the cap 54 is mounted to the guide cylinder 40 (lubricant sealing step S6).

By the above, the compressor 1 having the vibrometer 20 is manufactured.

The attachment 30 that supports the probe 21 is held by the guide cylinder 40 while being inserted in the guide cylinder 40, and the vibrometer 20 is supported at two points: at the outside securing nut 45 and at the female thread 152 in the bearing housing 15. This can ensure sufficient rigidity of the entire vibrometer 20, and reduce natural frequency of the vibrometer 20 to avoid resonance.

When the vibrometer 20 is removed from the compressor 1, the operation may be performed in reverse order of the attaching procedure described above, that is, in order from step S6 to S1.

Specifically, after the cap 54 and the packing 52 are removed, by performing the following steps it is possible to remove the vibrometer 10: a step of releasing the outside securing nut 45; a step of releasing the probe 21 from the female thread 152 in the bearing housing 15 by rotating the upper end of the attachment 30 around the axis; and then a step of withdrawing the attachment 30 and the probe 21 out of the guide cylinder 40.

According to this embodiment, the vibrometer 20 is supported at two points: at the bearing housing 15 and at the guide cylinder 40 secured to the cover case 121, and the vibrometer 20 can be attached to or removed from the compressor 1 by access from the outside of the cover case 121. Thus, the vibrometer 20 can be inspected or exchanged without any trouble to disassemble and open the cover case 121 of the compressor 1. Since the inside of the cover case 121 in which the bearing housing 15 is placed is filled with air unlike the inside of a body of the case 12 that houses the compression mechanism, there is no need to stop the operation of the compressor 1 for inspecting or exchanging the vibrometer 20.

According to this embodiment, the guide cylinder 40 and the attachment 30 are provided that support the operation for inserting the vibrometer 20 from the outside of the cover case 121 into the through hole 122 and the inside insertion securing hole 150 in the bearing housing 15 away from the through hole 122. Thus, the probe 21 of the vibrometer 20 can be guided up to the opening 151A of the inside insertion securing hole 150 and the probe 21 can be accurately axially aligned with the inside insertion securing hole 150, thereby allowing the probe 21 to be easily secured to the female thread 152 in the bearing housing 15.

Other than the above, the configurations in the embodiment may be chosen or changed to other configurations without departing from the gist of the present invention.

The number and the shape of the movable portions of the attachment 30 are not limited to those in the above embodiment. In the above embodiment, the attachment 30 has the four joints 31 to 34 coupled by the pins, but any of the joints may be replaced with a movable joint such as a universal joint. The attachment 30 may have only three joints coupled by pins although such an attachment 30 has a lower degree of freedom comparing to the above embodiment.

Variants of the attachment 30 may include, for example, a configuration having two joints 31, 33 and one universal joint, or a configuration having two universal joints without any joints coupled by a pin. Also in such cases, the joints or the universal joints can be used to change the posture of the attachment to align the axial center of the probe 21 with the axial center of the inside insertion securing hole 150 as in the above embodiment.

In the present invention, the attachment that can support the operation for inserting the probe of the vibrometer may have any configuration as long as the attachment at least partially has a movable portion that can move the axial center of the probe 21.

For example, instead of the joints 31 to 34 coupled by the pins, a member such as a tube made of a flexible material like rubber may be used as the movable portion. Alternatively, an attachment 30 generally formed of a rubber tube may be used.

Due to the configuration in which the parts 301 to 305 having sufficient rigidity to hold their own shapes are coupled by the joints 31 to 34 as in the above embodiment, the posture of the attachment 30 can be easily changed to an intended posture and the posture can be easily held inside or outside the guide cylinder 40, thereby allowing an axial alignment operation to be efficiently performed.

The vibrometer assembly and the methods for attaching and removing the vibrometer of the present invention can be widely applied to, not limited to the compressor 1, a rotating machine such as a pump or a blower as long as it includes a rotating shaft, a bearing that supports the rotating shaft, and a case that covers the bearing.

INDUSTRIAL APPLICABILITY

The present invention may be developed to, besides the vibrometer, a sensor or a measuring device that needs to be placed close to a rotating shaft and attached or removed by access from outside a case.

REFERENCE SIGNS LIST

1 compressor
2 vibrometer assembly
10 bearing device
11 rotating shaft
11A end
11B outer peripheral surface
11C flange
12 case
14 journal bearing
15 bearing housing
15A outer periphery
16 thrust bearing
17 housing
20 vibrometer
21 probe
21A thread
21B end
22 conductor
30 attachment
30B outside end
30N pawl
31 to 34 joint(s) (movable portion(s))
40 guide cylinder
40A end surface
41 cap attaching portion
42 flange
43 case attaching portion
45 outside securing nut (outside securing portion)
51 seal
52 packing
53 packing retainer
54 cap
121 cover case
122 through hole
122A female thread
150 insertion hole
151 round hole
151A opening
152 female thread
153 recess
153A tapered surface
201 distal end
301 to 305 part(s)
301A female thread
301W double nut
305A groove
305B male thread
451, 452 washer
A, B arrow
D1 radial direction
P1, P2 pin(s)
S1 guide cylinder placing step
S2 guiding step
S3 axially aligning step
S4 inside securing step
S5 outside securing step
S6 lubricant sealing step
Sp space
X, X0 axis

The invention claimed is:

1. A vibrometer assembly including a vibrometer configured to measure vibration of a rotating shaft, comprising:
   a probe of the vibrometer that is to be secured to a bearing device that supports the rotating shaft;
   a guide cylinder that is to be provided to a case so as to penetrate the case and protrude into the case, the case being located outside the bearing device;
   an attachment that is to be connected to the probe and inserted into the guide cylinder, and at least partially has a movable portion to allow the probe to be axially aligned with an inside securing portion in the bearing device; and
   an outside securing portion that secures the attachment to the guide cylinder or the case outside the case.

2. The vibrometer assembly according to claim 1, wherein
   the inside securing portion includes a female thread that is provided in a housing of the bearing device to secure the probe, and
   the outside securing portion includes a fixture that secures an end of the attachment to the guide cylinder outside the case.

3. The vibrometer assembly according to claim 2, wherein the attachment has a plurality of joints arranged in a length direction of the guide cylinder.

4. The vibrometer assembly according to claim 2, wherein a seal is provided to seal a radial gap between the guide cylinder and the attachment.

5. The vibrometer assembly according to claim 2, comprising packing that is provided to the probe so as to be brought into close contact with an outer periphery of a conductor withdrawn through an inside of the attachment to an outside of the case.

6. The vibrometer assembly according to claim 2, comprising a cap that is to be mounted to the guide cylinder or the case so as to cover the outside securing portion.

7. The vibrometer assembly according to claim 1, wherein the attachment has a plurality of joints arranged in a length direction of the guide cylinder.

8. The vibrometer assembly according to claim 7, wherein the attachment has a plurality of parts, the parts adjacent to each other in the length direction forming the plurality of joints by being coupled by pins at least four points, the pins for two of the four points being directed perpendicularly to the pins for the other two points.

9. The vibrometer assembly according to claim 8, wherein a seal is provided to seal a radial gap between the guide cylinder and the attachment.

10. The vibrometer assembly according to claim 8, comprising packing that is provided to the probe so as to be brought into close contact with an outer periphery of a conductor withdrawn through an inside of the attachment to an outside of the case.

11. The vibrometer assembly according to claim 8, comprising a cap that is to be mounted to the guide cylinder or the case so as to cover the outside securing portion.

12. The vibrometer assembly according to claim 7, wherein a seal is provided to seal a radial gap between the guide cylinder and the attachment.

13. The vibrometer assembly according to claim 7, comprising packing that is provided to the probe so as to be brought into close contact with an outer periphery of a conductor withdrawn through an inside of the attachment to an outside of the case.

14. The vibrometer assembly according to claim 7, comprising a cap that is to be mounted to the guide cylinder or the case so as to cover the outside securing portion.

15. The vibrometer assembly according to claim 1, wherein a seal is provided to seal a radial gap between the guide cylinder and the attachment.

16. The vibrometer assembly according to claim 1, comprising packing that is provided to the probe so as to be brought into close contact with an outer periphery of a conductor drawn through an inside of the attachment to an outside of the case.

17. The vibrometer assembly according to claim 1, comprising a cap that is to be mounted to the guide cylinder or the case so as to cover the outside securing portion.

18. A rotating machine comprising:
a rotating shaft;
a bearing device; and
a case; and
a vibrometer assembly including a vibrometer configured to measure vibration of the rotating shaft,
the vibrometer assembly comprising:
a probe of the vibrometer that is to be secured to the bearing device that supports the rotating shaft;
a guide cylinder that is to be provided to the case so as to penetrate the case and protrude into the case, the case being located outside the bearing device;
an attachment that is to be connected to the probe and inserted into the guide cylinder, and at least partially has a movable portion to allow the probe to be axially aligned with an inside securing portion in the bearing device; and
an outside securing portion that secures the attachment to the guide cylinder or the case outside the case.

19. A method for attaching a vibrometer configured to measure vibration of a rotating shaft to a rotating machine including the rotating shaft, comprising:
a guiding step of inserting a probe of the vibrometer and an attachment connected to the probe from an outside of a case of the rotating machine into the case through a guide cylinder inserted into a through hole in the case, and making a distal end of the probe reach a bearing device that supports the rotating shaft;
an axially aligning step of moving a movable portion at least partially included in the attachment to axially align the probe with an inside securing portion in the bearing device;
an inside securing step of securing the probe to the bearing device inside the case; and
an outside securing step of securing the attachment to the guide cylinder or the case outside the case.

20. A method for removing a vibrometer configured to measure vibration of a rotating shaft from a rotating machine including the rotating shaft, comprising:
a step of, in a state in which: a probe of the vibrometer connected to an attachment enabled to move a movable portion for axially aligning the probe at least partially included in the attachment is secured to a bearing device that supports the rotating shaft; and the attachment is secured to a case of the rotating machine or a guide cylinder provided to the case to hold the attachment, releasing the attachment from the case or the guide cylinder outside the case;
a step of releasing the probe from the bearing device inside the case; and
a step of withdrawing the probe and the attachment to an outside of the case.

* * * * *